United States Patent [19]

Morita et al.

[11] Patent Number: 5,625,017
[45] Date of Patent: Apr. 29, 1997

[54] PROCESS FOR PREPARING A POLYMER USING LITHIUM INITIATOR PREPARED BY IN SITU PREPARATION

[75] Inventors: Koichi Morita; Atsushi Nakayama; Yoichi Ozawa; Ryota Fujio, all of Tokyo, Japan

[73] Assignee: Bridgestone Corporation, Tokyo, Japan

[21] Appl. No.: 531,975

[22] Filed: Sep. 21, 1995

Related U.S. Application Data

[63] Continuation-in-part of Ser. No. 136,934, Oct. 18, 1993, abandoned.

[30] Foreign Application Priority Data

Oct. 19, 1992 [JP] Japan ................................ 4-280137

[51] Int. Cl.$^6$ ........................ C08F 2/06; C08F 4/08; C08F 36/04
[52] U.S. Cl. .................... 526/180; 526/174; 526/175; 526/204; 526/335; 526/340; 525/332.9; 525/342; 525/370; 525/371; 525/374; 525/383; 525/385; 525/386
[58] Field of Search ........................ 526/173, 180, 526/174, 175, 204, 340, 335; 525/342, 370, 371, 374, 383, 385, 386, 332.9

[56] References Cited

U.S. PATENT DOCUMENTS

| | | | |
|---|---|---|---|
| 2,849,432 | 8/1958 | Kibler et al. | 526/180 |
| 5,332,810 | 7/1994 | Lawson et al. | 526/180 |

FOREIGN PATENT DOCUMENTS

| | | |
|---|---|---|
| 48-17674 | 5/1973 | Japan . |
| 54-79590 | 6/1975 | Japan . |
| 54-22484 | 2/1979 | Japan . |

*Primary Examiner*—Fred Teskin
*Attorney, Agent, or Firm*—Sughrue, Mion, Zinn, Macpeak & Seas

[57] ABSTRACT

A process for preparing a polymer comprises polymerizing a conjugated diene monomer and/or a vinylaromatic hydrocarbon monomer in a hydrocarbon solvent in the presence of or in the absence of a randomizer by using a lithium polymerization initiator which is formed by bringing an organolithium compound and at least one secondary amine compound into contact with each other in the polymerization system in the presence of at least said monomer, wherein the polymerization conversion at the time of contact is less than 5%. The secondary amine is an amine compound having two hydrocarbon groups bonded to N or an imine compound in which an NH group and a saturated or unsaturated cyclic structure group form a cyclic structure. The cyclic structure group comprises a hydrocarbon group as the ring member and may also comprise N or O. The method of production uses the initiator which does not require separate preparation of the initiator, shows excellent reproducibility, allows for the evaluation of accuracy of concentration and realizes high effective initiator concentration. The high molecular weight polymer produced by the method has a narrow molecular weight distribution; is controllable; has a highly reproducible molecular weight and microstructure; exhibits excellent coupling properties based on the living polymerization and provides low hysteresis loss properties.

15 Claims, No Drawings

PROCESS FOR PREPARING A POLYMER USING LITHIUM INITIATOR PREPARED BY IN SITU PREPARATION

CONTINUITY

This is a continuation-in-part application of U.S. patent application Ser. No. 08/136,934 filed Oct. 18, 1993, now abandoned.

BACKGROUND OF THE INVENTION

1. Field of the Invention

The present invention relates to a process of preparing a polymer of a conjugated diene monomer and/or a vinylaromatic hydrocarbon monomer by using a lithium polymerization initiator and the polymer prepared by said method. More particularly, it relates to a process for preparing a polymer having low hysteresis loss and a high molecular weight by using a novel lithium initiator which can be easily used and has excellent efficiency of polymerization initiation and reproducibility and the novel polymer prepared by said process.

2. Description of the Prior Art

The need to reduce fuel cost for automobiles has been increasingly emphasized in recent years. As a result, rubber compounds used for tire treads have been extensively studied with the intent of reducing hysteresis loss. Process for preparing a polymer with a molecular structure having tertiary amines at the ends have also been studied to this end.

One such process is the polymerization of a conjugated diene by using the lithium amides separately prepared in a solvent in advance as the initiator (U.S. Pat. No. 2,849,432). However, because the lithium amides are essentially insoluble or hardly soluble in solvents, storage stability is very poor and storage and handling of the initiator are difficult. When the amide having poor or no solubility is used as the initiator in polymerization, efficiency of the polymerization is low because concentration of the soluble effective initiator necessary for the polymerization is low. Furthermore, the concentration of the initiator is not reproducible and accurate evaluation of the concentration is difficult. Therefore, this process inevitably causes numerous unfavorable results. For example, the molecular weight distribution of the polymer is made broader and reproducibility is bad. Also, the control of structure of the polymer, such as molecular weight, microstructure and the like, by molecular design is made difficult and not reproducible.

Another such process is the polymerization of a conjugated diene and a vinyl aromatic hydrocarbon by using, as the initiator, soluble lithium amides containing a dienyl polymer or the like having an extremely low molecular weight as an additional component and separately prepared in advance (U.S. Pat. No. 5,332,810). When a polymer is industrially produced, it is essential that the initiator used in the production of the polymer does not show any change in properties such as the ability to initiate the polymerization after storage for a long time (storage stability), and that the initiator can be used at any time necessary.

The soluble lithium amide initiator described above, however, shows very inferior storage stability. Because this initiator is inherently unstable as described above, precipitates are formed after storage for only several days, and the ability to initiate the polymerization disappears after storage for a month. When copolymerization, for example copolymerization of styrene and butadiene, is initiated by this initiator, the polymer obtained has a higher molecular weight, a broader molecular weight distribution, a larger Mooney viscosity, and a higher tan δ, which result in deterioration of the workability and the low hysteresis loss property, the deterioration worsening as the length of time over which the initiator is stored increases.

Still another such process is the polymerization of a conjugated diene in the presence of a solubilizing agent for the lithium amides, such as an ether or the like, by using the lithium amides prepared separately in advance as the initiator (Japanese Patent Application Laid Open Nos. 1975-79590 and 1979-22484). However, since the initiator in this process is also the pre-prepared lithium amides, the same problems as in the process described above, such as insolubility in solvents, poor storage stability and difficulty in handling, still remain in the process of preparing the initiator. Even though the lithium amides show a tendency of being solubilized by the solubilizing agent present in the polymerization system, performance is insufficient. Thus, satisfactory results concerning initiation efficiency, reproducibility of effective initiator concentration and control and reproduction of the molecular structure of the polymer obtained have not been achieved. Furthermore, because ether or the like is used as the solubilizing agent which is the essential component in the polymerization system, content of 1,2-linkage or 3,4-linkage in the diene polymer obtained is increased. Thus, another drawback of this process is that the microstructure of the polymer cannot be varied as desired.

Still another such process is the homopolymerization and copolymerization of an aromatic vinyl compound and a conjugated diolefin, such as styrene and butadiene, wherein the molecular weight and the molecular weight distribution of polymers are controlled by adding a primary or a secondary amine to the polymerization system after the start of the polymerization (Japanese Patent Publication No. Showa 48(1973)-17674).

However, the process described above does not clearly disclose the polymerization conversion which should be reached at the time of the addition of the amine compound after the start of the polymerization. The specification of the aforementioned publication describes that a polymer having a molecular weight distribution in which two peaks are found at a lower molecular weight side and at a higher molecular weight side is obtained when an amine compound is added at a polymerization conversion of about 25 to about 75%. In the examples, an amine compound is added at a polymerization conversion of 37.4 to 77.2%. This manner of addition of an amine compound is natural because the object of the addition of an amine compound in the publication described above is to control molecular weight and molecular weight distribution. Accordingly, a polymer having a low hysteresis loss cannot be obtained by the process of the publication described above. In the present invention, it has been discovered that, when an amine compound is added to the polymerization system at a time when the polymerization conversion is very low or 0%, the polymer obtained exhibits a low hysteresis loss.

A process for preparing a telomer of a 1,3-diene by using butyllithium and a secondary amine is known although it is not a process for preparing a high molecular weight polymer (K. Takebe et al., Tetrahedron Letters, 1972, No. 39, page 4009). This process is related to a process for preparing a telomer containing amine by bringing a large amount of a secondary amine and a small amount of a 1,3-diene into contact with a small amount of butyllithium to effect a continuous transfer reaction between low molecular weight diene lithium and the secondary amine according to the practice of organic synthesis. Thus, this process is entirely different from the process for preparing a polymer of high molecular weight which is the object of the present invention.

The known lithium amides separately prepared in advance which are the initiators have the property of being insoluble or hardly soluble in solvents because they are strong bases containing a hetero chemical elements. Therefore, it has poor storage stability and its ability as the initiator varies according to the time of storage. For example, when the lithium amides are prepared as a solution in a solvent by adding a small amount of an ether compound or a dienyl polymer having a low molecular weight as the solubilizer, the solution changes to a suspended form with the passing of time so as to cause a significant decrease of activity although the system is formed as a solution in the initial stage. This phenomenon is the cause of the numerous unfavorable results as described above regarding the initiator itself and the polymer obtained.

Thus, even though various trials have been made to obtain a polymer having tertiary amines at the ends and low hysteresis loss, no process to date satisfies the requirements of the initiator itself, such as excellent stability, reproducibility, initiating efficiency and easy handling, or the requirements for the polymer obtained, such as the desired molecular structure, reproducibility of the molecular structure and desired physical properties.

SUMMARY OF THE INVENTION

Accordingly, a first object of the present invention is to provide a process for preparing a polymer by using an initiator which does not require any of a separation process in advance, facilities for it, facilities for storage and control of storage stability and can be handled easily.

A second object of the present invention is to provide a process for preparing a polymer by using an initiator which shows excellent reproducibility, allows for the evaluation of accurate concentration and realizes high effective initiator concentration.

A third object of the present invention is to provide a process for preparing a polymer having a high molecular weight with a narrow molecular weight distribution; is controllable; has a highly reproducible molecular weight and microstructure; provides excellent coupling properties based on the living polymerization; and has low hysteresis loss properties.

All of the objects described above were achieved utilizing the process for preparing a polymer described below.

The process for preparing a high molecular weight polymer in the present invention comprises polymerizing at least one monomer selected from the group consisting of conjugated diene monomers and vinylaromatic hydrocarbon monomers in a hydrocarbon solvent in the presence of or in the absence of a randomizer by using a lithium polymerization initiator which is formed by bringing following compounds (1) and (2) into contact with each other in the polymerization system in the presence of at least said monomer, wherein the polymerization conversion at the time of contact is less than 5%:

(1) an organolithium compound; and
(2) at least one secondary amine compound selected from the group consisting of amine compounds expressed by the formula (A):

wherein $R^1$ and $R^2$ are, respectively, a hydrocarbon group having 1 to 20 carbon atoms selected from the group consisting of aliphatic hydrocarbon groups, alicyclic hydrocarbon groups and aromatic hydrocarbon groups and may be the same or different from each other, and imine compounds expressed by the formula (B):

wherein X is a group forming a cyclic structure with the nitrogen atom and is selected from the group consisting of (X-I) saturated type cyclic structure groups comprising $(CR^3R^4)_n$, (X-II) saturated type cyclic structure groups comprising $(CR^5R^6)_m$ and $NR^7$ or O, and (X-III) cyclic structure groups having a molecular structure which is derived from a structure group selected from the saturated type cyclic structure groups X-I and X-II by converting at least a part of carbon-carbon single bonds in the ring forming part thereof into a carbon-carbon double bond. $R^3$, $R^4$, $R^5$ and $R^6$ are, respectively, a hydrogen atom or a hydrocarbon group having 1 to 10 carbon atoms selected from the group consisting of aliphatic hydrocarbon groups, alicyclic hydrocarbon groups and aromatic hydrocarbon groups. $R^7$ is a hydrocarbon group having 1 to 10 carbon atoms selected from the group consisting of aliphatic hydrocarbon groups, alicyclic hydrocarbon groups and aromatic hydrocarbon groups. $R^3$, $R^4$, $R^5$, $R^6$ and $R^7$ may be the same or different from each other, n is an integer of 3 to about 15 and m is an integer of 2 to 9.

Other and further objects, features and advantages of the invention will appear more fully from the following description.

DETAILED DESCRIPTION OF THE INVENTION

According to the process for preparing a polymer in the present invention, the organolithium compound and the secondary amine are brought into contact in the presence of butadiene, styrene and the like in the polymerization system (in situ) and polymerization by the soluble polymerization initiator proceeds extremely smoothly without formation of insoluble substances in a manner similar to the polymerization by using an organolithium compound alone. Molecular structure and physical properties of the obtained polymer suggest that living polymerization by an active species of an almost single kind which is considered to be =NLi takes place and, furthermore, a coupling reaction can be effected easily, according to necessity.

The organolithium compound used in the preparation process in the present invention includes all generally known organolithium compounds and is not particularly limited. Examples of the organolithium compound are: alkyllithiums, such as methyllithium, ethyllithium, propyllithium, n-butyllithium, sec-butyllithium, tert-butyllithium, hexyllithium, octyllithium and the like; aryllithiums, such as phenyllithium, tolyllithium, lithium naphthylide and the like; alkenyllithiums, such as vinyllithium, propenyllithium and the like; alkylenedilithiums, such as tetramethylenedilithium, pentamethylenedilithium, hexamethylenedilithium, decamethylenedilithium and the like; and the like organolithium compounds.

The amount of the organolithium compound is decided according to the desired molecular weight of the polymer and generally is used in the range of 0.05 to 15 mmol, preferably in the range of 0.1 to 10 mmol, based on 100 g of the monomer. When the amount is more than 15 mmol, it is difficult to obtain a high molecular weight polymer. When the amount is less than 0.05 mmol, occasionally the organolithium compound is deactivated by impurities in the polymerization system and the polymerization does not proceed. Thus, amounts out of the specified range are not preferable.

The secondary amine compound used in the preparation process in the present invention is at least one compound selected from amine compounds expressed by the formula (A) described above and imine compounds expressed by the formula (B) described above.

As the amine compound expressed by the formula (A) described above, an amine compound in which $R^1$ and $R^2$ are, respectively, a hydrocarbon group having 1 to 10 carbon atoms selected from the group consisting of aliphatic hydrocarbon groups, alicyclic hydrocarbon groups and aromatic hydrocarbon groups, is preferable. Examples of such amine compound are dimethylamine, diethylamine, dipropylamine, di-n-butylamine diisobutylamine, dipentylamine, dihexylamine, diheptylamine, dioctylamine, diallylamine, dicyclohexylamine, butylisopropylamine, dibenzylamine, methylbenzylamine, methylhexylamine, ethylhexylamine and the like. Among them, an amine compound in which $R^1$ and $R^2$ are, respectively, an aliphatic hydrocarbon group having 1 to 10 carbon atoms, is more preferable.

As the imine compound expressed by the formula (B) in which X-I is selected as X in the formula (B), an imine compound in which $R^3$ and $R^4$ are, respectively, a hydrogen atom or an aliphatic hydrocarbon group having 1 to 8 carbon atoms and n is an integer of 3 to about 15 is preferable. Examples of the imine compound are trimethyleneimine, pyrrolidine, piperidine, 2-methylpiperidine, 3-methylpiperidine, 4-methylpiperidine, 3,5-dimethylpiperidine, 2-ethylpiperidine, hexamethyleneimine, heptamethyleneimine, dodecamethyleneimine and the like. Among them, an imine compound in which $R^3$ and $R^4$ are, respectively, a hydrogen atom or an aliphatic hydrocarbon group having 1 to 5 carbon atoms and n is an integer of 3 to 12, is more preferable.

As the imine compound expressed by the formula (B) in which X-II is selected as X in the formula (B), an imine compound in which $R^5$ and $R^6$ are, respectively, a hydrogen atom or an aliphatic hydrocarbon group having 1 to 5 carbon atoms, $R^7$ is an aliphatic hydrocarbon group having 1 to 5 carbon atoms and m is an integer of 3 to 5, is preferable. Examples of such imine compound are morpholine, N-methylpiperazine, N-ethylpiperazine, N-methylimidazolidine, N-ethylimidazolidine and the like. Among them, an imine compound in which $R^5$ and $R^6$ are, respectively, a hydrogen atom, $R^7$ is an aliphatic hydrocarbon group having 1 to 5 carbon atoms and m is an integer of 3 to 5, is more preferable.

As the imine compound expressed by the formula (B) in which X-III is selected as X in the formula (B), an imine compound having a structure group derived from a structure group selected from the preferable structure groups X-I and X-II described above by converting at least a part of carbon-carbon single bonds in the ring forming part thereof into a carbon-carbon double bond is preferable. Examples of such imine compound are oxazine, pyrroline, pyrrole, azepine and the like.

The amount of the secondary amine used in the preparation process in the present invention is in the range of 0.01 to 20 mol equivalent, preferably in the range of 0.1 to 5 mol equivalent, based on 1 mol equivalent of the organolithium compound. For achieving high coupling efficiency and low hysteresis loss of the polymer obtained by addition of a coupling agent or the like to the polymerization system after finishing the polymerization, the secondary amine is used in an amount in the range of 0.2 to 1.5 mol equivalent. When the amount of the secondary amine is higher, unfavorable phenomena, such as a decrease in coupling efficiency caused by the deactivation of the lithium at the chain end and an increase of hysteresis loss of the polymer obtained, take place. When the amount is less than 0.01 mol equivalent, efficiency of introducing the tertiary amine to the ends of the polymer is too small to achieve effective state of the physical properties of the polymer prepared in the present invention. Physical properties include, for example, low hysteresis loss. When the amount is more than 20 mol equivalent, the amount of oligomers containing amine which do not contribute to achieving better physical properties is increased. Thus, amounts outside the specified range are not preferable.

The monomer used in the method of production of the present invention is at least one monomer selected from conjugated dienes and vinylaromatic hydrocarbons. Examples of the conjugated diene are 1,3-butadiene, isoprene, 1,3-pentadiene, 2,3-dimethylbutadiene, 2-phenyl-1,3-butadiene, 1,3-hexadiene and the like. 1,3-butadiene is preferable among them. Examples of the vinylaromatic hydrocarbon are styrene, a-methylstyrene, 1-vinylnaphthalene, 3-vinyltoluene, ethylvinylbenzene, divinylbenzene, 4-cyclohexylstyrene, 2,4,6-trimethylstyrene and the like. Styrene is preferable among them. When copolymerization is conducted by using a conjugated diene and a vinylaromatic hydrocarbon, it is particularly preferable that 1,3-butadiene and styrene are used as the respective monomers.

Concentration of the monomer in a solvent is generally in the range of 5 to 50% by weight and preferably in the range of 10 to 30% by weight. In the copolymerization of a conjugated diene and a vinylaromatic hydrocarbon, content of the vinylaromatic hydrocarbon in the charged monomer mixture is in the range of 3 to 50% by weight and preferably in the range of 5 to 45% by weight.

In the preparation process in the present invention, a randomizer, such as ether, is not required for the purpose of solubilization and the increase of reactivity of the polymerization initiator itself. Therefore, a randomizer is not necessarily used in the polymerization. However, a randomizer is favorably used for the purpose of obtaining a polymer having a desired molecular structure. The randomizer used herein is a compound having the function of controlling the microstructure of the conjugated diene polymer, such as increasing the content of 1,2-linkage in a butadiene polymer or in the butadiene part of a butadiene-styrene copolymer and increasing the content of 3,4-linkage in a isoprene polymer, or controlling composition and distribution of monomer units in a conjugated diene-vinyl aromatic hydrocarbon copolymer, such as randomization of the butadiene unit and the styrene unit in a butadiene-styrene copolymer. The randomizer is not particularly limited and includes all compounds generally used as the randomizer. Examples of the randomizer used are:

(1) ethers, (2) orthodimethoxybenzenes, (3) complex compounds of an alkali metal and a ketone or a triester of phosphorous acid, (4) compounds expressed by the following formulae:
$R(OM^1)_n$, $(RO)_2M^2$, $R(COOM^1)_n$, $ROCOOM^1$, $RSO_3M^1$ and $ROSO_3M^1$, wherein R is a hydrocarbon group selected from the group consisting of aliphatic hydrocarbon groups, alicyclic hydrocarbon groups and aromatic hydrocarbon groups, $M^1$ is an alkali metal, specifically lithium, sodium, potassium, rubidium or cesium, $M^2$ is an alkaline earth metal, specifically calcium or barium and n is an integer of 1 to 3, and (5) tertiary amine.

The randomizer is described more specifically in the following. The randomizer may be used singly or as a combination of two or more kinds.

Examples of (1) ether are 1,2-dimethoxyethane, 1,2-diethoxyethane, tetrahydrofuran, 2-methoxymethyltetrahydrofuran, diethyl ether, triethyleneglycol dimethyl ether and the like.

Examples of (2) orthodimethoxybenzene are veratrole, isohomoveratrol and the like.

Examples of (3) complex compounds of an alkali metal and a ketone or a triester of phosphorous acid are complex compounds of lithium, sodium, potassium, rubidium or cesium with a ketones, such as acetone, methyl ethyl ketone, diisopropyl ketone, benzophenone, acetophenone, dibenzyl ketone, fluorenone, xanthone, Michler's ketone, acetylacetone and the like, or a triester of phosphorous acid, such as triethyl phosphite, trioctyl phosphite, tribenzyl phosphite, trinonyl phosphite and the like.

The randomizers having the general formulae in (4) shown above are described in the following.

Examples of the alkali metal salt or alkaline earth metal salt of an alcohol or a phenol expressed by the general formula $R(OM^1)_n$ or $(RO)_2M^2$ are lithium salts, sodium salts, potassium salts, rubidium salts, cesium salts, calcium salts and barium salts of methyl alcohol, ethyl alcohol, isopropyl alcohol, tert-butyl alcohol, tert-amyl alcohol, cyclohexyl alcohol, allyl alcohol, 2-butenyl alcohol, benzyl alcohol, phenol, catechol, resorcinol, hydroquinone, 1-naphthyl alcohol, p-nonylphenol, pyrogallol and the like.

Examples of the alkali metal salt of a carboxylic acid or an acidic ester of carbonic acid expressed by the general formula $R(COOM^1)_n$ or $ROCOOM^1$ are lithium salts, sodium salts, potassium salts, rubidium salts and cesium salts of isovaleric acid, lauric acid, palmitic acid, stearic acid, oleic acid, resin acid, benzoic acid, pimelic acid, n-dodecyl acidic carbonate, phenyl acidic carbonate and the like.

Examples of the alkali metal salt of a sulfonic acid or an ester of sulfuric acid expressed by the general formula $RSO_3M^1$ or $ROSO_3M^1$ are lithium salts, sodium salts, potassium salts, rubidium salts and cesium salts of dodecylbenzenesulfonic acid, diisopropylnaphthalenesulfonic acid, laurylamide of N-methyl-N-methanesulfonic acid salt, sulfuric acid ester salt of lauryl alcohol, caproylethylene glycol sulfuric acid ester and the like.

Examples of (5) tertiary amine are triethylamine, tetramethylethylenediamine and the like.

The preferable randomizers among them are (1) ethers and (4) $R(OM^1)_n$.

The randomizer is used in an amount in the range of 0.01 to 1000 mol equivalent based on 1 mol equivalent of the organolithium compound.

In the preparation process in the present invention, it is very important that the organolithium compound is brought into contact with the secondary amine compound in the polymerization system in the presence of at least the monomer. When the preparation process satisfies this condition which compound should be mixed with the solvent, the order of mixing of both compounds and other conditions in the procedures are not particularly limited. As an example of the possible procedures, the solvent, the monomer, the randomizer and a solution of the secondary amine are mixed together and then a solution of the organolithium compound is added to the mixture.

It is also very important in the preparation process in the present invention that, when the organolithium compound is brought into contact with the secondary amine compound, the polymerization conversion at the time of contact is less than 5%, preferably about 0%. When the polymerization conversion at the time of contact is 5% or more, the low hysteresis loss property and the wear resistance of the polymer obtained deteriorate.

Polymerization according to the preparation method in the present invention can be conducted at a desired temperature in the range of about −80° to 150° C. and preferably at a temperature in the range of −20° to 100° C. The polymerization can be conducted under the pressure generated in the reaction condition. It is preferred that the polymerization system is held at a pressure sufficient for keeping the monomer substantially in a liquid phase. The pressure is different depending on the individual materials used for the polymerization, the diluents used and the polymerization temperature. A higher pressure may be used according to desire. The higher pressure can be obtained by increasing the pressure in the reactor by using a gas inert to the polymerization reaction or by other suitable methods.

In the preparation process in the present invention, any of bulk polymerization and solution polymerization can be adopted. Solution polymerization in an inert solvent is preferable. The solvent is preferably in a liquid phase under the generally adopted condition of polymerization. An aliphatic hydrocarbon, an alicyclic hydrocarbon or an aromatic hydrocarbon is used as the solvent. Preferable examples of the inert solvent are propane, butane, pentane, hexane, heptane, isooctane, cyclopentane, cyclohexane, methylcyclohexane, decane, benzene, tetrahydronaphthalene and the like. It is within the range of the present invention to use two or more kinds of the solvent as a mixture.

It is generally preferred that water, oxygen, carbon dioxide and other catalyst poisons are removed from all of the materials related to the polymerization procedure, such as the initiator components, the solvent, the monomer and the like.

In the polymerization reaction according to the preparation process in the present invention, the active lithium is present at the end of the polymer as in the case of a general anionic living propagation reaction by an organolithium compound when a suitable mol ratio of the secondary amine to the organolithium compound is selected. Therefore, the polymer can be modified by adding a coupling agent and/or an electrophillic agent after the polymerization reaction is finished. Examples of the coupling agent are: halogenated tin compounds, such as tin tetrachloride, methyltin trichloride, dibutyltin dichloride, tributyltin chloride and the like; allyltin compounds, such as tetraallyltin, diethyldiallyltin, tetra(2-octenyl)tin and the like; other tin compounds, such as tetraphenyltin, tetrabenzyltin and the like; halogenated silicon compounds, such as silicon tetrachloride, silicon tetrabromide, methylsilicon trichloride, dimethylsilicon dichloride, trimethylchlorosilane and the like; alkoxysilicon compounds, such as tetraphenoxysilicon, tetraethoxysilicon and the like; halogenated germanium compounds, such as germanium tetrachloride and the like; and the like other compounds. Examples of the electrophillic compound are: amides, such as N-methylpyrrolidone, N,N-dimethylimidazolidinone, N,N-dimethylformamide and the like; esters, such as diethyl phthalate, butyl acetate and the like; ketones, such as benzophenone, Michler's ketone, chalcone and the like; oxiranes, such as ethylene oxide, styrene oxide and the like; isocyanates, such as phenyl isocyanate, methylenebisphenyl isocyanate and the like; and the like other compounds. The preferable coupling agents among those described above are halogenated tin compounds and halogenated silicon compounds. The preferable electrophillic agents among those described above are amides and isocyanates.

The polymer obtained by the preparation process in the present invention has a high molecular weight. Number average molecular weight of the polymer before the coupling is in the range of $8 \times 10^3$ to $1 \times 10^6$ and preferably in the range of $5 \times 10^4$ to $8 \times 10^5$. When the molecular weight is lower than $8 \times 10^3$ or higher than $1 \times 10^6$, the effectiveness of the physical properties of the polymer in the present invention is not sufficiently exhibited and therefore is not preferable. The molecular weight is easily adjusted because it is independent of the amount of the secondary amine and dependent on the amount of the organolithium compound.

The rubbery polymer prepared according to the present invention is a vulcanizable rubber and can be advantageously applied to the manufacture of automobile tires, gaskets, sheets, belts, window frames, footwear, rubber threads, antivibration rubber, packing and the like. A copolymer containing a large amount of vinylaromatic hydrocarbon can be used as a resin and applied to shoe soles, floor tiles, adhesive compositions and various kinds of molded articles.

In the present invention, the organolithium compound, for example, butyllithium ($C_4H_9Li$), is brought into contact with the secondary amine (=NH) in the presence of the monomer, for example, butadiene ($CH_2=CH-CH=CH_2$), to effect polymerization. The polymerization is considered to proceed according to the following mechanism:

$$CH_2=CH-CH=CH_2 + =NH + C_4H_9Li$$

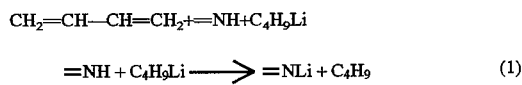

(1)

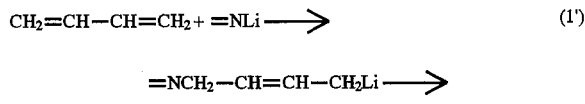

(1')

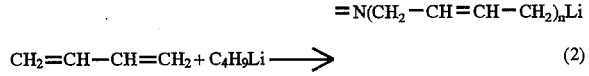

(2)

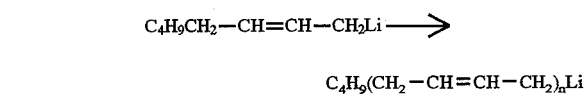

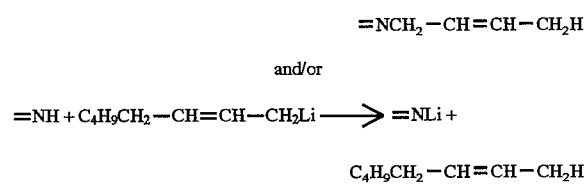

(3)

Reactions (1), (2) and (3) can be considered to take place in the polymerization system. When reactivities of the lithium species of alkyllithiums (1) and (2) and allyllithium (3) (benzyllithium in the case of styrene monomer) and reactivity of the secondary amine compound having a large acidity are taken into consideration, the reactions (1) and (3) take place more favorably than the reaction (2). Therefore, in the polymerization system, =NLi is formed predominantly (1), and then, the living polymerization proceeds by the function of this species as the initiator (1') to form the polymer having a tertiary amine at the end of the chain. When the amount of the secondary amine compound is small, the ordinary living polymerization also takes place along with the reactions described above. When the amount of the secondary amine compound is large, the following reactions are considered to take place: while the secondary amine compound is left remaining in the polymerization system, the chain transfer reaction (3) between the secondary amine compound and the oligomer lithium takes place and =NLi is formed along with the formation of the oligomer; and, after the secondary amine compound is exhausted completely, the living polymerization by =NLi (1') proceeds as long as the monomer is left remaining. In the polymerization system, no insoluble product is formed and the polymerization proceeds rapidly and homogeneously by the soluble polymerization initiator from the beginning of the polymerization. It is confirmed that the polymer obtained has the tertiary amine at one end of the chain, and that the coupling reaction takes place efficiently. Therefore, it can be concluded that the lithium polymerization initiator of the present invention is a soluble polymerization initiator which is considered to be =NLi formed by the contact of the organolithium compound and the secondary amine compound.

The reason that the molecular weight of the polymer of the present invention is decided by the amount of the organolithium compound independent of the amount of the secondary amine compound, is that the soluble and almost homogeneous active species of presumably =NLi, the number of which is decided by the amount of introduced organolithium, functions as the initiator of the living system. This means that, so long as the active lithium is present in some form, =NLi is formed by the reaction between the active lithium and the amine during the short initial period of the polymerization (the reaction (3) described above) even though the secondary amine is present in excess. Although the amount of oligomer containing amine is increased, a specific amount of =NLi decided by the amount of introduced organolithium is formed as the result. This =NLi functions as the initiator and thus the polymer having high molecular weight and a narrow molecular weight distribution is considered to be formed.

The reason that the narrow molecular weight distribution (M.W.D.) of the obtained polymer is independent from excess amount of amine is similar to the above described reason. If the rate of the chain transfer reaction is significant during the chain propagation period of the polymerization (shown in eq. (3), when n is large) the M.W.D. of the resultant polymers are remarkably large compared to those of usual living polymerizations. In the polymerization process of the present invention, even the excess amount of the free secondary amine, which may promote a chain transfer reaction, is expected to be consumed completely during the initiation period (eq. (3), when n is very small) as described above. Thus, in the polymerization process of the present invention, almost no chain transfer reaction takes place during the chain propagation period, and the M.W.D of the obtained polymer is simply determined by the balance of propagation and initiation rates as in usual living polymerizations.

EXAMPLES

The following examples are submitted for the purpose of further illustrating the nature of the present invention and should not be regarded as a limitation on the scope thereof. Parts and percentages shown in the examples are by weight unless otherwise indicated.

Measurements were conducted according to the following methods.

Number average molecular weight ($M_n$) and molecular weight distribution $M_w/M_n$) of the polymer were measured by gel permeation chromatography (GPC, HLC-8020® produced by Toso Co., Ltd.; column, GMH-XL®, parallel two columns, produced by Toso Co., Ltd.) detected by the differential refractive index (RI) with use of monodisperse polystyrene as the standard and calibrated by the polystyrene.

Coupling efficiency was measured when a coupling agent was added after polymerization had finished. It was obtained from the ratio of the area of the high molecular weight fraction and the area of the low molecular weight fraction in the measured curve of GPC.

The microstructure of the butadiene part in the polymer was obtained by the infrared process [D. Morero et al., Chem. e. Ind., volume 41, page 758 (1959)]. The amount of bound styrene in the butadiene-styrene copolymer was obtained from the ratio of the integrated areas in $^1$H-NMR spectrum.

As the index of hysteresis loss, tan δ was used. When tan δ was lower, the hysteresis loss was evaluated to be lower. Measurement of tan δ was conducted by using an apparatus for measuring viscoelasticity (a product of Rheometrix Co.) at the temperature of 50° C. at the strain of 11% and at the frequency of 15 Hz.

Wear resistance was measured according to the PICO wear testing method (ASTM D2228). The result of the measurement is shown as an index relative to the result in Example 8 which is set at 100. A larger value shows a better wear resistance.

All materials used in Examples and Comparative Examples were dried and purified.

Example 1

An 800 ml pressure resistant glass vessel which was dried and purged with nitrogen was charged with cyclohexane, butadiene monomer, styrene monomer, tetrahydrofuran (hereinafter abbreviated as THF) and hexamethyleneimine (hereinafter abbreviated as HMI) according to the formulation of polymerization shown in Table 1. To this solution, n-butyllithium (hereinafter abbreviated as BuLi) was added, and polymerization was conducted at 50° C. for 2 hours. The polymerization conversion at the time of contact of HMI and BuLi was 0%. In all Examples 2 to 7 which are described below, the polymerization conversion at the time of contact of a secondary amine and BuLi was also 0%. The polymerization system showed no precipitate at all and was homogeneous and clear throughout the period from the start to the end of the polymerization. Polymerization conversion was approximately 100%. A part of the polymerization solution was taken as a sample. Isopropyl alcohol was added to the sample solution and solid product obtained was dried to obtain a rubbery copolymer. Microstructure, molecular weight and molecular weight distribution were measured with this copolymer. The results are shown in Table 2.

Tin tetrachloride serving as the coupling agent was added to the polymerization solution obtained above in such an amount that the mol equivalent of the chlorine was equal to that of the active lithium atom at the polymer chain end and modification reaction was conducted at 50° C. for 30 minutes. Isopropyl alcohol was added to this solution and the solid product obtained was dried, to obtain a rubbery copolymer. Coupling efficiency was measured with this copolymer. The results are shown in Table 2.

By using the copolymer after the coupling, a compound was prepared according to the formulation shown in Table 3. Tan δ of a vulcanizate obtained by curing the compound at 145° C. for 33 minutes was measured. The results are shown in Table 2.

The following experiment was conducted for the purpose of confirming the presence of tertiary amine at the end of the polymer obtained by the present invention.

Because detection of the tertiary amine in a high molecular weight polymer is difficult, a low molecular weight polymer having number average molecular weight of 2000 was prepared by the same process as described above except that the amount of the monomer in the formulation of polymerization was decreased. The content of nitrogen in this polymer was measured and found to be 0.6%. The theoretical content of nitrogen was 0.7% when each molecule had one amine. Therefore, it was confirmed that the tertiary amine is bonded to the end of the polymer of the present invention.

Comparative Example 1

This example shows polymerization using lithium amide separately prepared in advance.

A 150 ml pressure resistant glass vessel which was dried and purged with nitrogen was charged with 38 ml of a 1.2M cyclohexane solution of HMI. To this solution, 30 ml of a 1.56M hexane solution of BuLi was added and N-lithium hexamethyleneimide (hereinafter abbreviated as LHMI) was obtained. Yield was approximately 100%. Insoluble fractions precipitated out of the reaction solution with the passing of time and the reaction solution turned into a suspension.

Polymerization was conducted by the same process as that in Example 1 except that BuLi and HMI in Example 1 were replaced with the suspension of LHMI (kept standing for 1 week after the preparation) of the same molar amount as shown in the formulation in Table 1. The results are shown in Table 2.

The polymerization system in Comparative Example 1 at the initiation stage was somewhat turbid and classified as a heterogeneous initiation type system.

Examples 2 and 3

Polymerization was conducted by the same process as that in Example 1 except that 0.5 mmol of HMI in Example 1 was replaced with 0.25 mmol of HMI in Example 2 and with 1.0 mmol of HMI in Example 3 as shown in Table 1. Coupling reaction was not conducted in either of Examples 2 and 3. The results are shown in Table 2. The appearance of the polymerization system in Examples 2 and 3 was the same as that in Example 1.

Example 4

Polymerization was conducted by the same method as that in Example 1 except that HMI in Example 1 was replaced with dihexylamine (hereinafter abbreviated as DHA), that styrene and tetrahydrofuran were not used, that the amount of butadiene was increased, as shown in Table 1, and that the coupling reaction was not conducted. The results are shown in Table 2. The appearance of the polymerization system was the same as that in Example 1.

Comparative Example 2

This example shows polymerization using lithium amide separately prepared in advance.

By the preparation according to the same process as that in Comparative Example 1 except that HMI in Comparative Example 1 was replaced with DHA, N-lithiumdihexyl amide (hereinafter abbreviated as LDHA) was obtained. At the time of the preparation, insoluble fractions instantaneously precipitated out from the reaction solution and a suspension was formed.

Polymerization was conducted by the same process as that in Example 4 except that BuLi and DHA in Example 4 were replaced with the suspension of LDHI of the same molar amount as that shown in the formulation in Table 1 and that the coupling reaction was not conducted. The results are shown in Table 2.

The polymerization system in Comparative Example 2 at the initiation stage was turbid and classified as a heterogeneous initiation type system.

Example 5

Polymerization was conducted by the same process as that in Example 1 except that HMI in Example 1 was replaced with pyrrolidine (hereinafter abbreviated as PY) as shown in Table 1 and that the coupling reaction was not conducted. The results are shown in Table 2. The appearance of the polymerization system was the same as that in Example 1.

Comparative Example 3

This example shows polymerization using lithium amide separately prepared in advance.

By the preparation according to the same process as that in Comparative Example 1 except that HMI in Comparative Example 1 was replaced with PY, N-lithiumpyrrolidine (hereinafter abbreviated as LPY) was obtained. At the time of the preparation, insoluble fractions instantaneously precipitated out from 'the reaction solution and a suspension was formed.

Polymerization was conducted by the same process as that in Example 5 except that BuLi and PY in Example 5 were replaced with the suspension of LPY of the same molar amount as shown in the formulation in Table 1 and that the coupling reaction was not conducted. The results are shown in Table 2.

The polymerization system in Comparative Example 3 at the initiation stage was turbid and classified as a heterogeneous initiation type system.

Example 6

Polymerization was conducted by the same process as that in Example 1 except that HMI in Example 1 was replaced with dodecamethyleneimine (hereinafter abbreviated as DDMI) as shown in Table 1. The results are shown in Table 2. The appearance of the polymerization system was the same as that in Example 1. By using the copolymer obtained after the coupling reaction by addition of tin tetrachloride, a compound was prepared by mixing components according to the formulation shown in Table 3.

Example 7

Polymerization was conducted by the same process as in Example 1 except that THF in Example 1 was replaced with 0.05 eq/Li of tert-amyloxypotassium (hereinafter abbreviated as KOt-Am) and that amounts of butadiene and styrene were replaced with those shown in Table 1. The results are shown in Table 2. The appearance of the polymerization system was the same as that in Example 1.

Comparative Example 4

This example shows polymerization using lithium amide separately prepared in advance.

Polymerization was conducted by the same process as that in Example 6 except that BuLi and HMI in Example 6 were replaced with the suspension of LHMI (the same as in Comparative Example 1) of the same molar amount as shown in the formulation in Table 1. The results are shown in Table 2. The appearance of the polymerization system was the same as that in Example 1.

The polymerization system in Comparative Example 4 at the initiation stage was somewhat turbid and classified as a heterogeneous initiation type system.

Comparative Example 5

This example shows polymerization using BuLi initiator alone.

Polymerization was conducted by the same method as that in Example 1 except that HMI was not used. By using the copolymer after the coupling reaction, tan $\delta$ was measured by the same method as in Example 1 to obtain the value of 0.11.

TABLE 1

| Formulation of Polymerization | | | |
|---|---|---|---|
| (Part 1) | | | |
| | solvent | monomer | |
| | cyclohexane (g) | butadiene (g) | styrene (g) |
| Example 1 | 315 | 48 | 12 |
| Comparative Example 1 | 315 | 48 | 12 |
| Example 2 | 315 | 48 | 12 |
| Example 3 | 315 | 48 | 12 |
| Example 4 | 315 | 60 | 0 |
| Comparative Example 2 | 315 | 60 | 0 |
| Example 5 | 315 | 48 | 12 |
| Comparative Example 3 | 315 | 48 | 12 |
| Example 6 | 315 | 48 | 12 |
| Example 7 | 315 | 36 | 24 |
| Comparative Example 4 | 315 | 36 | 24 |

| (Part 2) | | | | |
|---|---|---|---|---|
| | initiator system | | | |
| | organo-lithium compound (mmol) | secondary amine (mmol) | lithium amide (mmol) | randomizer (eq/Li) |
| Example 1 | BuLi 0.5 | HMI 0.5 | — | THF 55 |
| Comparative Example 1 | — | — | LHMI 0.5 | THF 55 |
| Example 2 | BuLi 0.5 | HMI 0.25 | — | THF 55 |
| Example 3 | BuLi | HMI | — | THF |

TABLE 1-continued

Formulation of Polymerization

| | | | | |
|---|---|---|---|---|
| | 0.5 | 1.0 | — | 55 |
| Example 4 | BuLi | DHA | — | — |
| | 0.5 | 0.5 | — | — |
| Comparative | — | — | LDHA | — |
| Example 2 | — | — | 0.5 | — |
| Example 5 | BuLi | PY | — | THF |
| | 0.5 | 0.5 | — | 55 |
| Comparative | — | — | LPY | THF |
| Example 3 | — | — | 0.5 | 55 |
| Example 6 | BuLi | DDMI | — | THF |
| | 0.5 | 0.5 | — | 55 |
| Example 7 | BuLi | HMI | — | KOt-Am |
| | 0.5 | 0.5 | — | 0.05 |
| Comparative | — | — | LHMI | KOt-Am |
| Example 4 | — | — | 0.5 | 0.05 |

TABLE 2

Results of Polymerization

(Part 1)

| | | microstructure* | |
|---|---|---|---|
| | appearance at the start of polymerization | content of 1,2-linkage (% of total butadiene) | content of styrene (%) |
| Example 1 | clear | 58 | 20 |
| Comparative Example 1 | somewhat turbid | 60 | 20 |
| Example 2 | clear | 59 | 20 |
| Example 3 | clear | 58 | 21 |
| Example 4 | clear | 12 | 0 |
| Comparative Example 2 | turbid | 12 | 0 |
| Example 5 | clear | 59 | 20 |
| Comparative Example 3 | turbid | 59 | 21 |
| Example 6 | clear | 59 | 20 |
| Example 7 | clear | 18 | 40 |
| Comparative Example 4 | somewhat turbid | 18 | 41 |

(Part 2)

| | molecular weight* $M_n$ (×10$^5$) | molecular weight distribution* $M_w/M_n$ | coupling efficiency (%) | tan δ |
|---|---|---|---|---|
| Example 1 | 2.0 | 1.07 | 75 | 0.091 |
| Comparative Example 1 | 3.2 | 1.32 | 28 | 0.121 |
| Example 2 | 2.1 | 1.06 | — | — |
| Example 3 | 2.1 | 1.13 | — | — |
| Example 4 | 2.2 | 1.40 | — | 0.153 |
| Comparative Example 2 | 2.8 | 1.80 | — | 0.172 |
| Example 5 | 2.1 | 1.07 | — | 0.124 |
| Comparative Example 3 | 2.3 | 1.25 | — | 0.146 |
| Example 6 | 2.1 | 1.13 | 70 | 0.094 |
| Example 7 | 2.3 | 1.15 | 65 | 0.096 |
| Comparative Example 4 | 3.0 | 1.30 | 29 | 0.134 |

*Measured before the coupling.

TABLE 3

Formulation for Compounding

| | |
|---|---|
| copolymer | 100 parts |
| HAF carbon black | 50 |
| aromatic oil | 10 |
| stearic acid | 2 |
| antioxidant 6C*[1] | 1 |
| zinc oxide | 3 |
| accelerator DPG*[2] | 0.5 |
| accelerator DM*[3] | 1.0 |
| sulfur | 1.5 |

*[1]N-(1,3-dimethylbutyl)-N'-phenyl-p-phenylenediamine
*[2]diphenylguanidine
*[3]dibenzothiazyl disulfide The following may be deduced from the results in Table 2.

In Comparative Examples 1 to 4 in which lithium amide separately prepared in advance was used as the initiator, the polymerization system immediately after addition of the initiator was turbid in all cases and took the form of initiation of polymerization classified as the heterogeneous type though some difference could be found between the cases because the lithium amide thus prepared is naturally insoluble in solvents. Therefore, the efficiency of initiation was poor and the active species was unstable. As the result, molecular weight could not be controlled but increased, the molecular weight distribution was made broader, the coupling efficiency was remarkably decreased (Comparative Examples 1 and 4), and tan δ was significantly inferior.

In contrast, the polymerization was conducted by bringing butyllithium and the secondary amine into contact with each other in the polymerization system in Example 1 to 7 according to the process in the present invention. When the kind of secondary amine was varied (Examples 1, 4, 5 and 6), when the mol ratio of lithium and amine was varied (Examples 1, 2 and 3), when the kind of monomer was varied (for example, Examples 1 and 4) or when the kind of randomizer was varied (Examples 1 and 7), the polymerization system was always clear and took the form of polymerization classified as the homogeneous type. The efficiency of initiation in the Examples were larger than that in the Comparative Examples and stable living polymerization took place. Therefore, excellent results could be obtained in that molecular weight was well controlled, the molecular weight distribution was narrow and coupling efficiency was large (Examples 1, 6 and 7). The polymer having the tertiary amine at the end of the polymer chain and having the molecular structure comprising the chain containing tin-carbon bond formed by the coupling reaction can be easily obtained by the process in the present invention. This leads to the formation of a polymer having excellent physical properties, such as low hysteresis loss and the like.

As the comparison of the tan δ value of the conventional butadiene-styrene random copolymer prepared by BuLi shown in Comparative Example 5 and those of the copolymers in Examples 1 and 6 clearly shows, the copolymer in the present invention has lower hysteresis loss.

As the results of Examples 1, 2 and 3 show, the molecular weight of the polymer obtained was kept constant even when the mol ratio of lithium (kept constant) to the amine was varied. This means that the factor controlling the molecular weight depends on the amount of the organolithium compound and a polymer having a desired molecular weight can be obtained by suitably selecting the amount of the organolithium compound.

Example 8

An 800 ml pressure resistant glass vessel which was dried and purged with nitrogen was charged with 37.6 g of a 26.6% cyclohexane solution of styrene, 260 g of a 15.4% cyclohexane solution of butadiene, and 0.250 ml of a 1.6 mol hexane solution of BuLi, at about 10° C. To this solution, HMI of the same mol equivalent as that of BuLi and 55 mol equivalent of THF per one mol equivalent of Li were added before the start of the polymerization, in other words, when the polymerization conversion was 0%. Polymerization was conducted at 50° C. for 2 hours. Polymerization conversion was approximately 100%. A part of the polymerization solution was taken as a sample. Isopropyl alcohol was added to the sample solution, and the resultant solid product was dried to obtain a rubbery copolymer. The microstructure, molecular weight and molecular weight distribution of this copolymer were measured. The results are shown in Table 4.

Tin tetrachloride serving as the coupling agent was added to the polymerization solution obtained above in such an amount that the mol equivalent of the chlorine was equal to that of the active lithium atom at the polymer chain end, and modification reaction was conducted at 50° C. for 30 minutes. Isopropyl alcohol was added to this solution, and the resultant solid product was dried to obtain a rubbery copolymer. The coupling efficiency of this copolymer was measured, and the results are shown in Table 4.

By using the copolymer after the coupling, a compound was prepared according to the formulation shown in Table 5. Tan δ and wear resistance of the vulcanizate obtained by curing the compound at 145° C. for 33 minutes were measured. The results are shown in Table 4.

Example 9

This example was conducted by using the same processes as those in Example 8 except that HMI and THF were added when the polymerization conversion reached 2%, and that then the polymerization was allowed to continue. The yield of the polymer formed at the conversion of 2% and the molecular weight of the formed polymer were measured by GPC. The microstructures, molecular weight, and molecular weight distribution of the polymer obtained at the end of the copolymerization described above were measured. The coupling efficiency of the copolymer after the coupling was also measured. Tan δ and wear resistance of the vulcanizate obtained from the copolymer were measured as well. The results are shown in Table 4.

Comparative Examples 6 and 7

These examples were conducted by using the same processes as those in Example 9 except that HMI and THF were added when the polymerization conversion reached 5% (Comparative Example 6) or 10% (Comparative Example 7), and that then the polymerization was allowed to continue. Various measurements were conducted similarly. The results are shown in Table 4.

TABLE 4

(Part 1)

|  | at the time of addition of HMI | | | microstructure* content of | |
|---|---|---|---|---|---|
|  | conversion (%) | yield of polymer (%) | molecular weight $M_n$ (× $10^4$) | 1,2-linkage (% of total butadiene) | content of styrene (%) |
| Example 8 | 0 | 0 | — | 53 | 20.5 |
| Example 9 | 2 | 2 | 0.42 | 51 | 19.8 |
| Comparative Example 6 | 5 | 5 | 0.95 | 55 | 20.6 |
| Comparative Example 7 | 10 | 11 | 1.60 | 56 | 19.6 |

(Part 2)

|  | molecular weight* $M_n$ (× $10^5$) | molecular weight distribution* ($M_w/M_n$) | coupling efficiency (%) | tan δ | wear resistance |
|---|---|---|---|---|---|
| Example 8 | 2.1 | 1.05 | 74 | 0.082 | 100 |
| Example 9 | 2.0 | 1.07 | 75 | 0.094 | 96 |
| Comparative Example 6 | 2.15 | 1.07 | 71 | 0.108 | 89 |
| Comparative Example 7 | 1.98 | 1.06 | 73 | 0.113 | 76 |

*Measured before the coupling

TABLE 5

| Formulation for Compounding | |
|---|---|
| copolymer | 100 parts |
| HAF carbon black | 45 |
| stearic acid | 1.5 |
| antioxidant 6C*[1] | 0.6 |
| wax | 0.7 |
| zinc oxide | 2 |
| accelerator DPG*[2] | 0.2 |
| accelerator DM*[3] | 0.2 |
| accelerator NS*[4] | 0.7 |
| sulfur | 1.5 |

*[1]N-(1,3-dimethylbutyl)-N'-phenyl-p-phenylenediamine
*[2]diphenylguanidine
*[3]dibenzothiazyl disulfide
*[4]N-t-butyl–benzothiazolylsulfenamide As shown in Table 4, it is apparent that when an organolithium compound such as BuLi is brought into contact with a secondary amine such as HMI at a polymerization conversion of less than 5% such as 0% or 2%, the resultant copolymer has excellent low hysteresis loss property and wear resistance. When the two compounds are brought into contact with each other at a polymerization conversion of 5% or more, such as 5% or 10%, the resultant copolymer has inferior low hysteresis loss property and wear resistance. When the two compounds are brought into contact with each other at a higher polymerization conversion, such as 50% the molecular weight distribution of the resultant copolymer has two peaks, in other words, the molecular weight distribution is extremely broadened, although results of an example of this case are not shown.

Example 10

A 4 liter pressure resistant vessel which was dried and purged with nitrogen was charged with 554 g (1.22 pounds) of hexane, 345 g (0.76 pounds) of 33% by weight styrene in hexane, containing 1.06 mmol of tetramethylethylenediamine (TMEDA), 1312 g (2.89 pounds) of 25.4% by weight butadiene in hexane, 1.0 eq/Li of HMI, BuLi to monomer charged ratio of 1.0 meq of lithium per 100 g of monomer (1.0 meq Li phgm), in this order. The amount of BuLi was adjusted to the same as that of BuLi in Comparative Examples 8 to 12 described below wherein the initiator was separately prepared in advance. Polymerization conversion at the time when HMI and BuLi were brought into contact with each other was 0%. The polymerization was conducted at 49° C. for 2 hours. Thereafter, the same procedures as those in Example 8 were conducted.

The molecular weight and molecular weight distribution of the resultant copolymer, the coupling efficiency of the copolymer obtained after the modification, the Mooney viscosity of the compound prepared from the copolymer, and tan δ of the vulcanizate obtained from the compound were measured. The results are shown in Table 6.

Examples 11 to 14

Copolymers were prepared and evaluated according to the same process as that in Example 10 except that HMI and BuLi which had each been kept in storage for 1 day, 2 days, 1 week, and 1 month were used in Examples 11, 12, 13, and 14, respectively. The polymerization conversion at the time when HMI and BuLi were brought into contact with each other was 0% in all these examples. All the results are shown in Table 6.

Comparative Example 8

This example shows polymerization, using lithium amide separately prepared in advance.

A 4 liter pressure resistant reactor which was dried and purged with nitrogen was charged with 554 g (1.22 pounds) of hexane, 5.4 ml of 0.77 mol HMI in hexane (4.16 meq), and 2.7 ml of 1.58 mol BuLi in hexane (4.27 meq). This mixture was stirred overnight at 32° C. The reactor was then charged with 90 g of 25.4% by weight butadiene in hexane (423 mmol of butadiene), and the mixture was heated at 43° to 49° C. for 1 hour, to prepare an initiator.

This reactor was subsequently charged with 345 g (0.76 pounds) of 33% by weight styrene in hexane, containing 1.06 mmol of TMEDA, 1312 g (2.89 pounds) of 25.4 by weight butadiene in hexane. This provided for an initiator to monomer charged ratio of 1.0 meq of lithium per 100 g of monomer (1.0 meq Li phgm). Polymerization was allowed to continue for 2 hours at 49° C. Thereafter, the same procedures as those in Example 10 were conducted. All of the results are shown in Table 6.

Comparative Examples 9 to 12

These examples show polymerization using lithium amide separately prepared in advance.

Copolymers were prepared and evaluated according to the same processes as those in Comparative Example 8 except that initiators prepared in advance and kept in storage for 1 day, 2 days, 1 week, and 1 month were used in Comparative Examples 9, 10, 11, and 12 respectively. All of the results are shown in Table 6.

TABLE 6

|  | storage time | molecular weight* $M_n$ ($\times 10^5$) | molecular weight distribution* $M_w/M_n$ | coupling efficiency (%) | Mooney viscosity $ML_{1+4}$ | tan δ |
|---|---|---|---|---|---|---|
| Example 10 | 0 day | 2.20 | 1.07 | 82 | 68 | 0.079 |
| Comparative Example 8 | 0 day | 2.60 | 1.18 | 61 | 71 | 0.088 |
| Example 11 | 1 day | 2.15 | 1.06 | 81 | 64 | 0.084 |
| Comparative Example 9 | 1 day | 3.70 | 1.24 | 42 | 80 | 0.106 |
| Example 12 | 2 days | 2.15 | 1.07 | 84 | 62 | 0.083 |
| Comparative Example 10 | 2 days | 3.90 | 1.25 | 41 | 82 | 0.110 |
| Example 13 | 1 week | 2.20 | 1.08 | 81 | 65 | 0.082 |
| Comparative Example 11 | 1 week | 4.90 | 1.59 | 38 | 89 | 0.114 |
| Example 14 | 1 month | 2.09 | 1.06 | 82 | 64 | 0.081 |
| Comparative Example 12 | 1 month |  | no polymerization |  |  |  |

*Measured before the coupling

Storage stability of an initiator itself or materials therefor is essential to industrial production of a rubber. In other words, an initiator itself or materials therefor must be able to be kept in storage and used at any time necessary.

As shown in Table 6, in accordance with the present invention, all of the properties of the resultant copolymer, such as molecular weight, molecular weight distribution, coupling efficiency, Mooney viscosity as an index for workability, and tan δ as an index for the low hysteresis loss property, are kept at high levels with good stability even when the materials for the initiator are kept in storage for 0 days to one month.

In Comparative Examples 8 to 11 in which initiators separately prepared in advance were used, the molecular weight, molecular weight distribution, Mooney viscosity, and tan δ of the resultant copolymers increased remarkably and coupling efficiency decreased significantly as the storage time of the initiator increased. These results show that the copolymer prepared by using the initiator separately prepared in advance cannot be used as a low hysteresis loss rubber. Furthermore, as shown in Comparative Example 12, the initiator separately prepared in advance lost its polymerization activity after it had been kept in storage for one month.

While the present invention has been particularly shown and described with reference to preferred embodiments thereof, it will be understood by those skilled in the art that the foregoing and other changes in form and details can be made therein without departing from the spirit and scope of the invention.

What is claimed is:

1. A process for preparing a high molecular weight polymer comprising polymerization of at least one monomer selected from the group consisting of conjugated diene monomers and vinyl-aromatic hydrocarbon monomers in a hydrocarbon solvent in the presence of or in the absence of a randomizer by using a lithium polymerization initiator which is formed by bringing the following compounds (1) and (2) into contact with each other in the polymerization system in the presence of at least said monomer, wherein the polymerization conversion at the time of contact is less than 5%:

(1) an organolithium compound; and
   (2) at least one secondary amine compound selected from the group consisting of imine compounds expressed by the formula (B):

(B)

wherein X is a group forming a cyclic structure with the nitrogen atom and is selected from the group consisting of (X-I) saturated type cyclic structure groups comprising $(CR^3R^4)_n$, (X-II) saturated type cyclic structure groups comprising $(CR^5R^6)_m$ and $NR^7$ or O, and (X-III) cyclic structure groups having a molecular structure which is derived from a structure group selected from the saturated type cyclic structure groups X-I and X-II by converting at least a part of carbon-carbon single bonds in the ring forming part thereof into a carbon-carbon double bond, $R^3$, $R^4$, $R^5$ and $R^6$ are, respectively, a hydrogen atom or a hydrocarbon group having 1 to 10 carbon atoms selected from the group consisting of aliphatic hydrocarbon groups, alicyclic hydrocarbon groups and aromatic hydrocarbon groups, $R^7$ is a hydrocarbon group having 1 to 10 carbon atoms selected from the group consisting of aliphatic hydrocarbon groups, alicyclic hydrocarbon groups and aromatic hydrocarbon groups, $R^3$, $R^4$, $R^5$, $R^6$ and $R^7$ may be the same or different from each other, n is an integer of 3 to 15 and m is an integer of 2 to 9.

2. A process for preparing a polymer as claimed in claim 1, wherein the polymerization conversion at the time of contact is about 0%.

3. A process for preparing a polymer as claimed in claim 1, wherein the amount of the secondary amine is 0.01 to 20 mol equivalent based on 1 mol equivalent of the organolithium compound.

4. A process for preparing a polymer as claimed in claim 1, wherein $R^3$ and $R^4$ in X-I used as X in the formula (B) are, respectively, a hydrogen atom or an aliphatic hydrocarbon group having 1 to 8 carbon atoms and n is an integer of 3 to 15.

5. A process for preparing a polymer as claimed in claim 4, wherein the imine compound expressed by the formula (B) in which X-I is used as X is trimethyleneimine, pyrrolidine, hexamethyleneimine, dodecamethyleneimine or piperidine.

6. A process for preparing a polymer as claimed in claim 4, wherein the imine compound expressed by the formula (B) in which X-I is used as X is trimethyleneimine or piperidine.

7. A process for preparing a polymer as claimed in claim 1, wherein $R^5$ and $R^6$ in X-II used as X in the formula (B) are, respectively, a hydrogen atom or an aliphatic hydrocarbon group having 1 to 5 carbon atoms, $R^7$ in X-II used as X in the formula (B) is an aliphatic hydrocarbon group having 1 to 5 carbon atoms and m is an integer of 3 to 5.

8. A process for preparing a polymer as claimed in claim 1, wherein X-III used as X in the formula (B) is derived from X-I in which $R^3$ and $R^4$ are, respectively, a hydrogen atom or an aliphatic hydrocarbon group having 1 to 8 carbon atoms and n is an integer of 3 to 13 or from X-II in which $R^5$ and $R^6$ are, respectively, a hydrogen atom or an aliphatic hydrocarbon group having 1 to 5 carbon atoms, $R^7$ is an aliphatic hydrocarbon group having 1 to 5 carbon atoms and m is an integer of 3 to 5.

9. A process for preparing a polymer as claimed in claim 1, wherein the randomizer is at least one compound selected from the group consisting of:

(1) ethers,
   (2) tertiary amines, and
   (3) compounds expressed by the following general formulae:

$R(OM^1)_n$, $(RO)_2M^2$, $R(COOM^1)_n$, $ROCOOM^1$, $RSO_3M^1$ and $ROSO_3M^1$, wherein R is a hydrocarbon group selected from the group consisting of aliphatic hydrocarbon groups, alicyclic hydrocarbon groups and aromatic hydrocarbon groups, $M^1$ is an alkali metal selected from the group consisting of lithium, sodium, potassium, rubidium and cesium, $M^2$ is an alkaline earth metal selected from the group consisting of calcium and barium and n is an integer of 1 to 3.

10. A process for preparing a polymer as claimed in claim 1, wherein the conjugated diene is 1,3-butadiene.

11. A process for preparing a polymer as claimed in claim 1, wherein the vinylaromatic hydrocarbon monomer is styrene.

12. A process for preparing a polymer as claimed in claim 1, wherein the conjugated diene is 1,3-butadiene and the vinylaromatic hydrocarbon monomer is styrene.

13. A process for preparing a polymer as claimed in claim 1, wherein at least one of a coupling agent and an electrophilic agent is added to the polymerization system after the polymerization has finished.

14. A process for preparing a polymer as claimed in claim 13, wherein the coupling agent is a compound selected from the group consisting of tin compounds, silicon compounds and germanium compounds and the electrophilic agent is a compound selected from the group consisting of amides, esters, ketones, oxiranes and isocyanates.

15. A process for preparing a polymer as claimed in claim 14, wherein the tin compound is tin tetrachloride or dibutyltin dichloride and the silicon compound is silicon tetrachloride or dimethyldichlorosilane.

* * * * *